Jan. 29, 1952  E. L. ROBERTS  2,583,749
ANCHOR FOR GOPHER TRAPS
Filed May 15, 1948
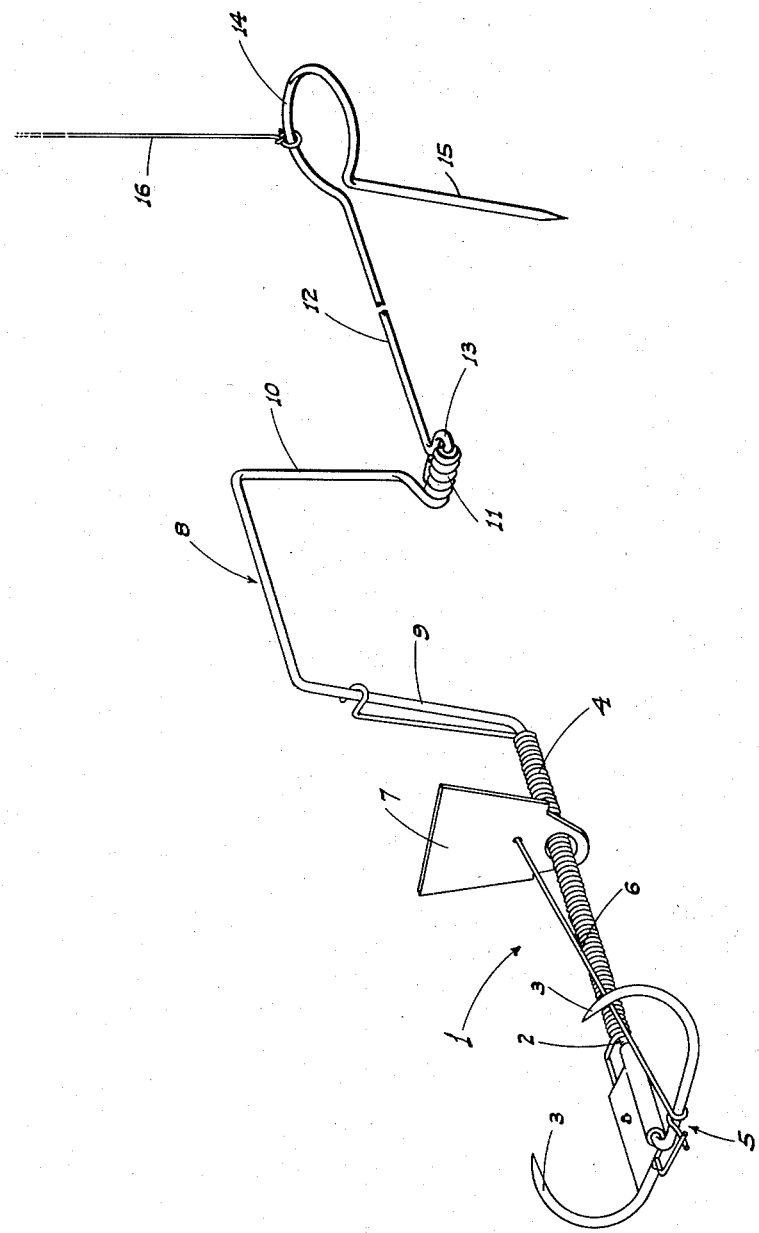
INVENTOR
E. L. Roberts
BY
ATTORNEYS

Patented Jan. 29, 1952

2,583,749

UNITED STATES PATENT OFFICE 2,583,749

ANCHOR FOR GOPHER TRAPS

Earle L. Roberts, Modesto, Calif.

Application May 15, 1948, Serial No. 27,179

2 Claims. (Cl. 43—96)

This invention relates generally to a trap for rodents, especially gophers.

In particular the invention is directed to, and it is an object to provide, a novel anchor assembly for a gopher trap; such anchor assembly being operative to prevent the trap from being shifted lengthwise by a gopher working along a hole and pushing dirt ahead of himself. An unanchored gopher trap, displaced as above, often frightens the gopher away, or does not trip at the proper moment, causing a miss.

Another object of the invention is to provide an anchor assembly, for a gopher trap, which stabilizes or balances the trap in the hole, and prevents undesirable lateral tilting of the trap.

A further object of the invention is to provide an anchor assembly, for gopher traps, which includes a novel hinge unit to facilitate initial attachment of the trap to the anchor assembly, and to also permit easy placement of said trap in the hole from a small excavation or pit dug down to the same.

A further object of the invention is to provide a practical and reliable anchor assembly for gopher traps, and one which will be exceedingly effective for the purpose for which it is designed.

These objects are accomplished by means of such structure and relative arrangement of parts as will fully appear by a perusal of the following specification and claims.

The drawing is a perspective view of a gopher trap as arranged with the novel anchor assembly.

Referring now more particularly to the characters of reference on the drawing, the novel anchor assembly is adapted to be used in connection with a gopher trap, indicated generally at 1, which gopher trap may include a longitudinal leg 2 fitted, at its forward end, with normally open, laterally projecting spring-actuated jaws 3, which jaws are adapted to close inwardly under the influence of a helical torsion spring 4 which surrounds the leg 2.

The spring loaded jaws 3 are normally maintained apart by a trigger unit 5, which includes a trip rod 6 which extends rearwardly to an upstanding trigger plate 7 having a bore in its lower end through which the leg 2 and surrounding spring 4 extend.

At its rear end the longitudinal leg 2 includes, in integral relation, an inverted generally U-shaped member, indicated at 8, which member includes an upstanding forward leg 9 and an upstanding rear leg 10.

The above described gopher trap is substantially conventional in its general assembly, but without the hereinafter described anchor assembly is subject to the following problem in use.

In the trapping of gophers it is usual to dig a small excavation or pit down to the gopher hole, and then the gopher trap is inserted in an adjacent end of the hole. A gopher working his way along the hole toward the pit pushes dirt ahead of himself, but frequently the trap is pushed ahead by the dirt and either does not trip at the proper moment to make a catch, or frightens the gopher away. To positively anchor the gopher trap in the hole, the present invention contemplates the following anchor assembly:

At its lower end the upstanding rear leg 10 is coiled, as shown, to form a transverse sleeve 11, and another longitudinal leg 12 extends rearwardly from the sleeve 11; said leg 12 including a transversely elongated eye 13 on its forward end, and such eye extends through the sleeve 11 whereby to form a hinge. By reason of this hinge arrangement the trap 1 is capable of only vertical motion with respect to the longitudinal leg 12.

At its rear end the longitudinal leg 12 merges with a horizontal loop 14 of substantial diameter, and the opposite end of said loop merges with a downwardly depending stake 15, pointed at its lower end, as shown.

With the above mentioned anchor assembly, the gopher trap 1 is inserted in the gopher hole from the pit; such insertion being facilitated by reason of hinging action possible between the sleeve 11 and eye 13. After the trap 1 is properly positioned in the hole the stake 15 is driven into the bottom of the pit for its full depth, and until the horizontal loop 14 rests directly on the pit bottom. As such loop is of substantial diameter it stabilizes or balances the entire arrangement and prevents any lateral tilting of the trap.

Additionally, the anchor assembly, including the stake 15, prevents any longitudinal displacement of the trap upon the approach of a gopher pushing dirt ahead of himself.

With the trap held stationary the dirt as pushed ahead by the gopher trips the trigger plate 7 at the correct moment for catching of the gopher between the then released jaws 3.

To prevent the trap being carried away by a larger gopher after trapping thereof, a safety cord or wire 16 is connected to the loop 14, and extends upwardly out of the pit for attachment to an anchor stake (not shown).

The above described anchor assembly for gopher traps provides a very practical and effective device for the balancing or stabilizing of the trap in the hole, and the prevention of undesirable shifting or displacement of the trap upon approach of a gopher, thus assuring of a greater percentage of catches.

It may be noted here that leg 12 is preferably quite elongated, while the much shorter depending stake 15 is disposed at a lesser angle than 90 degrees to said leg. This arrangement facilitates pressing the stake into the ground when the latter is hard.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In combination with a trap which comprises a relatively narrow stiff frame extending longitudinally of the trap and vertically upstanding with respect to the ground level when the trap is in operative position, an anchor means disposed to the rear of the frame effective to inhibit longitudinal movement of the trap or tilting thereof laterally of the longitudinal axis of said trap; such anchor means including a rigid leg projecting longitudinally of the trap for a distance beyond the rear end of the frame, a relatively large stiff flat loop fixed to the outer end of the leg and lying in a plane at right angles to the vertical plane of the trap frame to stabilize the leg against lateral tilting, a downwardly depending stake on the loop, and means connecting the leg and frame at adjacent ends, said connecting means being substantially rigid between the leg and frame with respect to relative lateral swinging of the former and relative lateral tilting of the latter.

2. In combination with a trap which comprises a relatively narrow stiff frame extending longitudinally of the trap and vertically upstanding with respect to the ground level when the trap is in operative position, an anchor means disposed to the rear of the frame effective to inhibit longitudinal movement of the trap or tilting thereof laterally of the longitudinal axis of said trap; such anchor means including a rigid leg projecting longitudinally of the trap for a distance beyond the rear end of the frame, a relatively large stiff flat loop fixed to the outer end of the leg and lying in a plane at right angles to the vertical plane of the trap frame to stabilize the leg against lateral tilting, a downwardly depending stake on the loop, and means connecting the leg and frame at adjacent ends including a pivot mount whose axis extends transversely of the longitudinal axis of the trap and leg.

EARLE L. ROBERTS.

REFERENCES CITED

The following references are of record in the file of this patent:

UNITED STATES PATENTS

| Number | Name | Date |
|---|---|---|
| 770,640 | Holmes | Sept. 20, 1904 |
| 1,222,024 | Pewther | Apr. 10, 1917 |
| 2,058,751 | Woolfrey | Oct. 27, 1936 |
| 2,156,021 | Little | Apr. 25, 1939 |
| 2,406,180 | Wampler | Aug. 20, 1946 |